United States Patent
Bae et al.

(10) Patent No.: US 7,817,714 B2
(45) Date of Patent: Oct. 19, 2010

(54) INTEGRATING RECEIVER HAVING ADAPTIVE FEEDBACK EQUALIZER FUNCTION TO SIMULTANEOUSLY REMOVE INTER-SYMBOL INTERFERENCE AND HIGH FREQUENCY NOISES AND SYSTEM HAVING THE SAME

(75) Inventors: Seung Jun Bae, Kyungbuk (KR); Hong June Park, Kyungbuk (KR)

(73) Assignee: Postech Foundation and Postech Academy Industry Foundation, Kyungbuk (KR)

( * ) Notice: Subject to any disclaimer, the term of this patent is extended or adjusted under 35 U.S.C. 154(b) by 858 days.

(21) Appl. No.: 11/623,517

(22) Filed: Jan. 16, 2007

(65) Prior Publication Data

US 2007/0171967 A1    Jul. 26, 2007

(30) Foreign Application Priority Data

Jan. 23, 2006    (KR) .................... 10-2006-0006832

(51) Int. Cl.
| | |
|---|---|
| H03H 7/30 | (2006.01) |
| H03H 7/40 | (2006.01) |
| H03K 5/159 | (2006.01) |
| H03G 11/04 | (2006.01) |
| H04B 3/04 | (2006.01) |

(52) U.S. Cl. ................ 375/233; 375/229; 375/230; 375/232

(58) Field of Classification Search .............. None
See application file for complete search history.

(56) References Cited

U.S. PATENT DOCUMENTS

| | | | | |
|---|---|---|---|---|
| 5,155,742 | A * | 10/1992 | Ariyavisitakul et al. ..... | 375/231 |
| 5,222,101 | A * | 6/1993 | Ariyavisitakul et al. ..... | 375/231 |
| 5,526,252 | A * | 6/1996 | Erdman ........................ | 363/41 |
| 6,088,390 | A * | 7/2000 | Russell et al. ............... | 375/233 |
| 7,023,946 | B2 * | 4/2006 | Sawada et al. .............. | 375/375 |
| 2005/0018794 | A1 * | 1/2005 | Tang et al. ................... | 375/341 |
| 2005/0185743 | A1 * | 8/2005 | Li ............................... | 375/350 |
| 2006/0071659 | A1 * | 4/2006 | Tatschl et al. .......... | 324/207.25 |
| 2007/0053256 | A1 * | 3/2007 | Buchler et al. ........... | 369/44.29 |
| 2007/0091993 | A1 * | 4/2007 | Yang .......................... | 375/233 |
| 2007/0109163 | A1 * | 5/2007 | Lai ............................. | 341/143 |
| 2007/0206670 | A1 * | 9/2007 | Aziz .......................... | 375/233 |

(Continued)

*Primary Examiner*—David C Payne
*Assistant Examiner*—Erin M File
(74) *Attorney, Agent, or Firm*—Jae Y. Park; Kile Park Goekjian Reed & McManus PLLC

(57) ABSTRACT

Provided is an integrating receiver having an adaptive decision feedback equalizer function and a system having the same. The integrating receiver can simultaneously remove an inter-symbol interference (ISI) and high frequency noises in a high speed DRAM data transmission system. The integrating receiver reduces a probability of wrong decision of data in a state in which the ISI that exists in a channel is removed so as to increase a signal-to-noise ratio (SNR) of a receiver, so that a maximum operation speed increases even in an environment with heavy noises. There is also provided a method of obtaining an equalizer coefficient suitable for the integrating receiver and a method of obtaining a reference voltage by using an integrator in a single ended transmission method. In addition, in order to increase a decision feedback equalizer speed, a look-ahead method is used. In this method, flip flops with a high speed including multiplexers are used. Accordingly, the present invention can be applied to not only a DRAM interface system but also a serial communication between chips.

10 Claims, 8 Drawing Sheets

U.S. PATENT DOCUMENTS

| | | | |
|---|---|---|---|
| 2007/0242741 A1* | 10/2007 | Carballo et al. | 375/233 |
| 2008/0187037 A1* | 8/2008 | Bulzacchelli et al. | 375/233 |
| 2008/0198916 A1* | 8/2008 | Zeng et al. | 375/233 |
| 2008/0198985 A1* | 8/2008 | Krampl et al. | 379/93.06 |
| 2008/0240224 A1* | 10/2008 | Carballo et al. | 375/233 |
| 2009/0116639 A1* | 5/2009 | Zimmerman et al. | 379/417 |
| 2010/0027709 A1* | 2/2010 | Kim et al. | 375/287 |

* cited by examiner $e[n]$ = Area of $x[n]$ (@1111) − Area of $x[n]$ (@X011)

INTEGRATING RECEIVER HAVING ADAPTIVE FEEDBACK EQUALIZER FUNCTION TO SIMULTANEOUSLY REMOVE INTER-SYMBOL INTERFERENCE AND HIGH FREQUENCY NOISES AND SYSTEM HAVING THE SAME

BACKGROUND OF THE INVENTION

1. Field of the Invention

The present invention relates to a data transmission system, and more particularly, to an integrating receiver having an adaptive decision feedback equalizer function capable of simultaneously removing an inter-symbol interference and high frequency noises and a system having the same.

2. Description of the Related Art

As a dynamic random access memory (DRAM) data transmission method, there are a multi drop channel method of simultaneously connecting a single signal line with several chips in order to increase a transmission data capacity, and a single ended method of reducing the number of signal lines and pins.

In the multi drop channel method, as shown in FIG. 1, a single signal line 110 is connected to several DRAM chips 101 to 10*n*. In input pins of the DRAM chips 101 to 10*n*, a parasitic resistance, a parasitic inductance, and a parasitic capacitance exist. Due to the parasitic components, in the multi drop method, a signal attenuation occurs, so that a channel frequency band decreases. This works as an inter-symbol interference (ISI) in a high frequency signal transmission, so that a voltage margin and a time margin of a transmitted signal may decrease. In general, in order to remove the ISI, an equalizer is widely used.

FIG. 2 is a view showing signal response characteristics in the multi drop channel method. Referring to FIG. 2, when an input pulse with a pulse width T is applied to a channel having a limited bandwidth, since the channel bandwidth is limited, a response signal Vo in the channel cannot arrive at a destination within a time T. When a time is 2 T and 3 T, an influence of the response signal Vo remains. The remaining signal influences on a next period, so that the ISI also occurs.

FIG. 3 is a view for explaining a decision feedback equalizer (DFE) that is a kind of receiving terminal equalizer. Referring to FIG. 3, a DFE 300 includes an adder 310, a decider 320, and a feedback loop 330. The DFE 300 can remove an ISI that occurs in advance in a current input signal by using values ŷ[n−1] and ŷ[n−2] of data decided before a period and before two periods provided by the feedback loop 330. This can be represented as the following Equation 1.

$$Y(nT)=V_{IN}(nT)-a1\bullet\hat{y}[n-1]-a2\hat{y}[n-2] \quad \text{[Equation 1]}$$

where a1 and a2 denote equalizer coefficients that represent an amount of ISI to be removed, and $V_{IN}(nT)$ denotes a receiving terminal input signal. Y(nT) denotes an output voltage of an equalizer from which the ISI is removed.

The DFE 300 has an advantage in that the DFE 300 can remove the ISI without amplifying high frequency noises of the input signal. However, since a maximum signal width of the input signal is attenuated and applied to the receiving terminal, there is a problem in that although the ISI is removed, a signal-to-noise ratio (SNR) decreases.

In order to use the equalizer, determining equalizer coefficients is most important. The equalizer coefficients may be changed according to characteristics of the channel and characteristics of a chip. In addition, the equalizer coefficients may also be changed according to processes of the chip, a voltage, and a change in temperature. In consideration of the change factors, precise equalizer coefficients can be determined. In general, a method of controlling an equalizer coefficient in order to have a maximum margin by using an input signal of the receiving terminal is widely used. This method is used for an adaptive equalizer.

In the single ended transmission method, in order to decide data in the receiving terminal, the data is compared to a reference voltage having an intermediate voltage between maximum and minimum voltage values of the data, so that a value of the data is decided. In this method, high frequency noises occur heavily as compared with a differential transmission method, so that there is a problem in that the signal-to-noise ratio (SNR) further decreases.

A first reason why the high frequency noises occur in the single ended transmission method is that a parasitic capacitance value between a reference voltage line and a common ground line and a parasitic capacitance value between the signal line and the common ground line are different such that high frequency noises that occur in the common ground line are differently applied to the signal line and the reference voltage line from each other. A second reason is that reflected waves and crosstalk that occur in the signal line occur as the high frequency noises.

As a method of reducing an influence of the high frequency noises that occur in the receiving terminal, there are a method of deciding a value of the data by extracting data several times during a period, and a method of deciding the value of the data by using an analog receiving circuit to perform an integration a value of the data during a period.

FIG. 4 is a view for explaining a conventional integrating receiver circuit. When the integrating receiver circuit 400 performs an integration function, an output voltage can be obtained by the following Equation 2.

$$\Delta V_{out} = \frac{1}{2C}g_m \cdot \int (V_{IN}(t) - V_{ref})dt \quad \text{[Equation 2]}$$

where, C is a capacitance value in an output of an integrator, and $g_m$ is a trans-conductance value of an input transistor. The integrating receiver circuit 400 reduces a probability of wrong decision of data so as to increase a signal-to-noise ratio (SNR) of a receiver.

As an input/output data transmission speed of the DRAM increases, the ISI and high frequency noises of the receiving terminal occur more heavily in the aforementioned multi drop channel method, so that there is a limitation to the transmission speed. Channel ISI occurs by a limitation to a frequency of the channel, and the high frequency noises of the receiving terminals locally occur in a receiving chip, so that the two noises simultaneously occur.

However, the equalizer is vulnerable to the high frequency noises, and the integrating receiver is vulnerable to low frequency noises such as the ISI, so that applying only the equalizer or only the integrating receiver to the DRAM is inefficient to achieve a maximum performance.

Therefore, in order to simultaneously remove the two speed limitation factors, a new receiver implementing the equalizer and the integrating receiver as a single circuit is needed. In addition, a development of a method of obtaining an equalizer coefficient that can be applied to the new receiver may cause an improvement in the input/output data transmission speed of the DRAM.

SUMMARY OF THE INVENTION

The present invention provides an integrating receiver having an adaptive decision feedback equalizer function capable of simultaneously removing an inter-symbol interference (ISI) and high frequency noises and a system having the same.

According to an aspect of the present invention, there is provided an integrating receiver including: a decision feedback equalizer (DFE); and an integrator performing an integration on an output of the DFE during a period to provide the integrated output to an decider in the DFE, wherein an ISI (inter-symbol interference) of a waveform equalized by the DFE is removed by using data values decided before a period and before two periods.

In the above aspect of the present invention, the DFE may include: an adder which receives an input signal input to the integrating receiver and the data values decided before a period and before two periods from a feedback filter and add them to generate an output signal; a decider comparing and an output voltage of the integrator with a predetermined reference voltage to decide the output voltage; and the feedback filter for multiplying the data values decided before a period and before two periods by first and second equalizer coefficients, respectively, to provide the multiplied values to the adder.

In addition, the first equalizer coefficient may be an average value of ISI values between 1.5 T and 2.5 T, the second equalizer coefficient may be an average value of the ISI values between 2.5 T and 3.5 T, and the T may be a width of an input pulse input to the integrating receiver.

In addition, the integrating receiver may represent an area difference between the output signals of the DFE when a pattern of the input signal is 1111 and X011 as an error signal, and when a value of the error signal is 0, determine a1 by using a sign least mean-squared (LMS) error algorithm when the input signal is 1011, and determine a2 when the input signal is 0011.

According to another aspect of the present invention, there is provided an integrating receiver system including: an integrating receiver removing an ISI of a waveform obtained by integrating and equalizing an output of a first DFE during a period by using data values decided before a period and before two period; an error detector generating an area difference between output signals when an input signal pattern of a second DFE is 1111 and X011 as an error signal; and an LMS controller obtaining an equalizer coefficient of the integrating receiver based on the error signal and a sign of the data decided by the integrating receiver.

In the above aspect of the present invention, the integrating receiver may include: an adder which receives an input signal input to the integrating receiver and data values decided before a period and before two periods from a feedback filter and adds them to generate an output signal; an integrator performing an integration on the output of the adder during a period; a decider comparing an output voltage of the integrator with a predetermined reference voltage to decide the output voltage; and the feedback filter multiplying the data values decided before a period and before two periods by first and second equalizer coefficients, respectively, to provide the multiplied values to the adder.

In addition, when the error signal has a value of 0, the error detector may determine a1 by using a sign least mean-squared (LMS) error algorithm when the input signal is 1011, and determine a2 when the input signal is 0011.

In addition, the integrating receiver system may further include a reference voltage generator which receives a clock as an input signal in an initial system setting mode and generates a reference voltage having an intermediate voltage of the input signal.

In addition, the reference voltage generator may include: an integrator integrating the clock that is the input signal; a comparator comparing an output of the integrator with the reference voltage; an up/down counter controlling a value obtained by integrating the clock to have a value of 0 according to the decided value of the comparator; a digital-analog converter converting a digital output value of the up/down counter into a current value; and a resistance with which the current value of the digital-analog converter is applied generates the reference voltage.

According to another aspect of the present invention, there is provided a receiver including: DFEs having a look-ahead integration function; and flip-flops connected to the DFEs, respectively, wherein each of the DFEs having the integration function receives an input signal during a ¼ time of a data frequency and receives data values decided before a period and before two period, and wherein each of the DFEs includes: a first DFE integrator that is operated when the data value decided before a period is 0; a second DFE integrator that is operated when the data value decided before a period is 1; and a comparator that selects one from outputs of the first and second DFE integrators according to the data value decided before a period.

In the above aspect of the present invention, each of the first and second DFE integrators may include: a precharge unit for precharging outputs of the first and second DFE integrators as a power source voltage in response to a first clock signal; a capacitor connected to the outputs of the first and second DFE integrators; and a differential comparator which integrates input signals during a ¼ time of the data frequency in response to a second clock signal according to the values decided before a period and before two periods and stores them in the capacitor.

In addition, the comparator may include: 2-to-1 multiplex with a differential type for selecting one from the outputs of the first and second DFE integrators in response to the selected signal; a flip flop for fine amplifying the output of the multiplex; and an inverter connected to the output of the flip flop.

Therefore, according to a receiver of the present invention, an ISI and high frequency noises that will be a problem of a high speed DRAM data transmission system can be simultaneously removed. The receiver simultaneously performs an equalizer function and an integration function by using a single circuit. In this method, a probability of wrong decision of data decreases, so that a signal-to-noise ratio (SNR) of the receiver increases. Accordingly, even in an environment with heavy noises, a maximum operation speed increases. A method of controlling a proper equalizer coefficient insensitive to a channel or a change in chip processes is used to obtain an equalizer coefficient suitable for the receiver according to the present invention. A sign least mean-squared (LMS) error algorithm according to the present invention can be simply implemented, and the sign LMS error algorithm decreases an area of a circuit and power consumption. The receiver according to present invention provides a method of obtaining a reference voltage by using an integrator in a single ended transmission method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
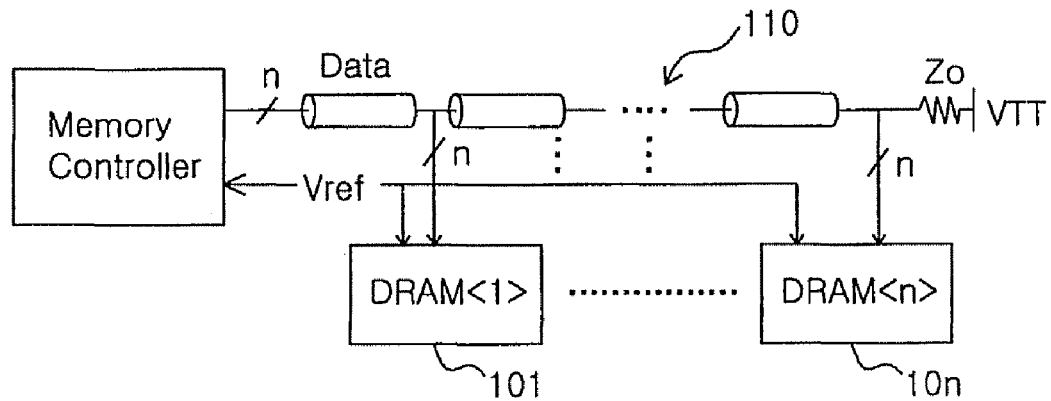
FIG. 1 is a view for explaining a conventional multi drop channel method.
Figure 2:
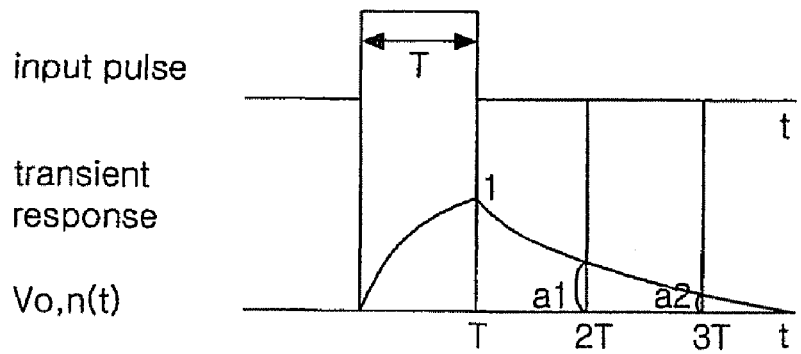
FIG. 2 is a view showing signal response characteristics in a multi drop channel method.

The attached drawings for illustrating exemplary embodiments of the present invention are referred to in order to gain a sufficient understanding of the present invention, the merits thereof, and the objectives accomplished by the implementation of the present invention.

Hereinafter, exemplary embodiments of the present invention will be described in detail with reference to the attached drawings. Like reference numerals in the drawings denote like elements.

Figure 5:
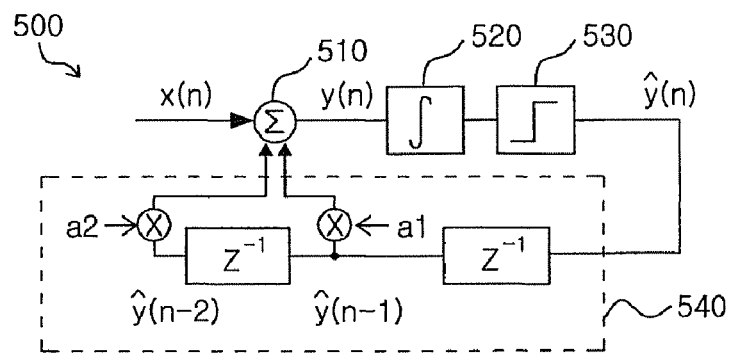
FIG. 5 is a block diagram of an integrating receiver circuit according to a first embodiment of the present invention.

FIG. 5 is a block diagram of an integrating receiver circuit according to a first embodiment of the present invention. Referring to FIG. 5, the integrating receiver circuit 500 includes an adder 510, an integrator 520, a decision circuit 530, and a feedback filter 540.

The adder 510 receives an input signal x(n) and values ŷ[n−1] and ŷ[n−2] of data decided before a period and before two periods and adds them to generate an output signal y(n) from which an inter-symbol interference (ISI) that has occurred in the current input signal x(n) is removed. The integrator 520 performs an integration on the output signal y(n) during a period to transmit the integrated signal to the decision circuit 530. The decision circuit 530 compares a voltage of the output signal y(n) integrated during a period with predetermined positive and negative reference voltages to provide a decision signal ŷ[n] having a value of 0 or 1 to the feedback filter 540. The feedback filter 540 multiplies the values ŷ[n−1] and ŷ[n−2] of the data decided before a period and before the two periods by equalizer coefficients a1 and a2, respectively, to provide the multiplied values to the adder 510.

Figure 3:
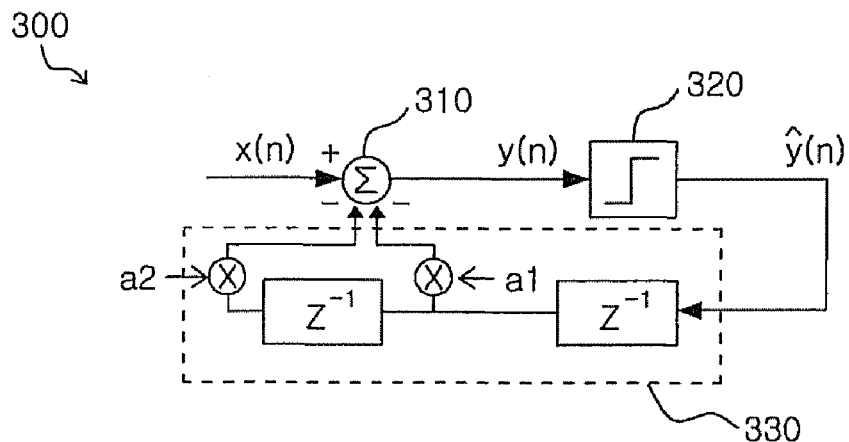
FIG. 3 is a view for explaining a decision feedback equalizer (DFE) that is used in a receiving terminal equalizer method.
Figure 4:
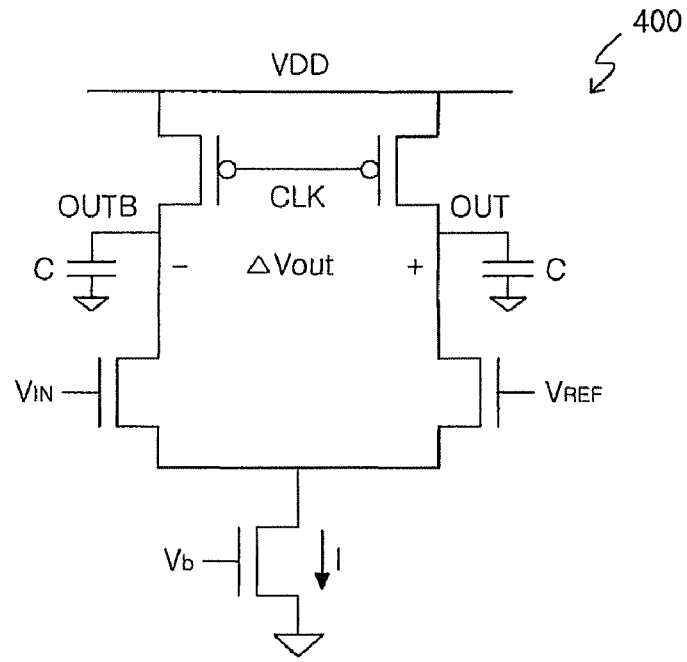
FIG. 4 is a view for explaining a conventional integrating receiver circuit.

In order to simultaneously remove the ISI and high frequency noises, the integrating receiver circuit 500 decides values of data by performs an integration on the y(n) during a period instead of directly extracting the y(n) from a conventional DFE 300 (see FIG. 3) to decide data. Accordingly, sensitivity to the high frequency noises decreases, so that a signal-to-noise ratio (SNR) of a signal increases. This can be represented by the following Equation 3.

$$Y((n+0.5)T) = \int_{n-0.5T}^{n+0.5T} (x(t) - a1 \cdot \hat{y}[n-1] - a2 \cdot \hat{y}[n-2]) dt \quad \text{[Equation 3]}$$

The conventional DFE 300 (see FIG. 3) removes the ISI when extracts a signal, however, the integrating receiver circuit 500 in the embodiment integrating the signal during a period, so that ISI during a period is removed.

Figure 6:
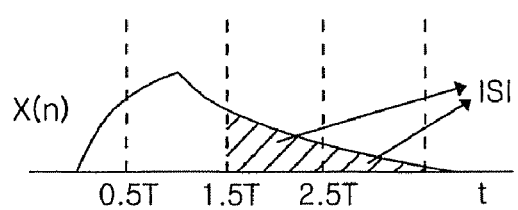
FIG. 6 is a view for explaining a method of determining an equalizer coefficient applied to the integrating receiver circuit in FIG. 5.

In characteristics of the input signal x(n) in FIG. 6, when an average value of ISI values between 1.5 T and 2.5 T is used as an equalizer coefficient a1, and an average value of ISI values between 2.5 T and 3.5 T is used as an equalizer coefficient a2, all of the ISI can be removed.

In this case, for a method of determining an equalizer coefficient, a sign least mean-squared (LMS) error algorithm is used. When the sign LMS error algorithm is used, the equalizer coefficients a1 and a2 are determined by the following Equation 4.

$$a1[n+1] = a1[n] + \text{step} \bullet \text{sign}(e[n]) \bullet \hat{y}[n-1] \quad \text{[Equation 4]}$$

$$a2[n+1] = a2[n] + \text{step} \bullet \text{sign}(e[n]) \bullet \hat{y}[n-2] \quad \text{[Equation 5]}$$

where, a1 and a2 are values corresponding to ISI before a period and before two periods, respectively, and step is a change unit of an equalizer coefficient. In addition, e[n] is an error signal and becomes 0 when the ISI is removed. ŷ[n−1] and ŷ[n−2] are values of data decided before a period and before two periods, respectively.

The sign LMS error algorithm controls equalizer coefficients by using the e[n] and a sign of the decided data, so that there is an advantage in that the algorithm can be simply implemented. The most difficult problem for the use of the algorithm is obtaining the e[n]. The error signal is obtained by a difference between the input signal with ISI of the receiver and a signal from which the ISI is removed.

However, in general, since an amount of the ISI is determined by characteristics of a channel and a chip, it is difficult to know the signal from which the ISI is removed in advance. In the embodiment of the present invention, there is provided a method of obtaining a sign e[n] by using an input signal and a high voltage value of the input signal.

Figure 7:
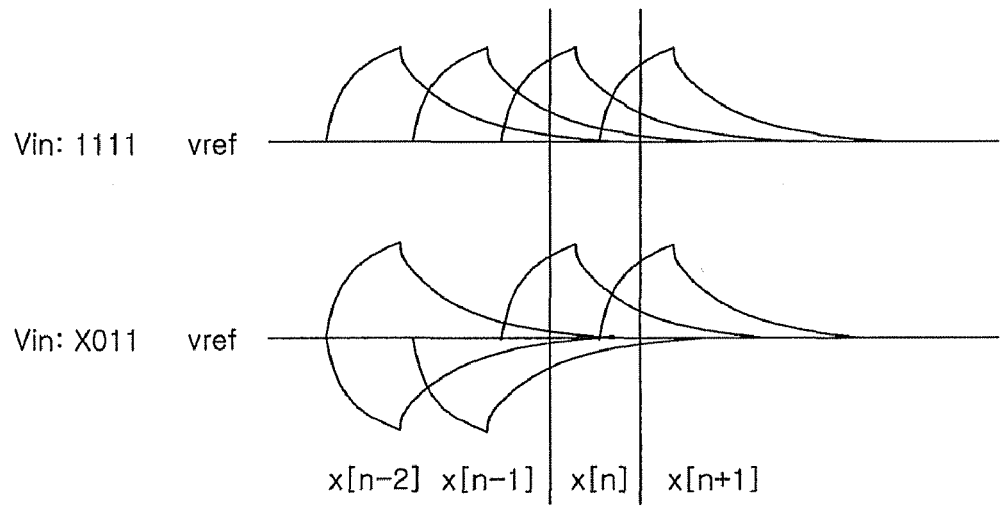
FIG. 7 is a view showing a method of obtaining an error signal e[n] applied to the integrating receiver circuit in FIG. 5.

FIG. 7 shows a method of obtaining an error signal e[n] according to an embodiment of the present invention. A signal x(n) applied to an integrating receiver 500 (see FIG. 5) is a sum of pulse response signals of a channel. Referring to FIG. 7, pulse response signals when signal patterns applied to the receiver are 1111 and X011, respectively, are shown. First, a pulse response signal when the signal pattern is 1111 is described. When a time of a current input signal is n, a signal x[n] includes a signal currently being transmitted from the signal x[n], ISI that occurs before a period and before two periods, and ISI that occurs by a pre-cursor generated in a coming signal x[n+1]. Here, when the equalizer coefficient has an optimized value, the ISI that occurs before two periods is removed.

Next, a pulse response signal when the signal pattern applied to the receiver is X011 is described. The input signal x(n) may have two values. As compared with the pulse response signal when the signal pattern is 1111, if 0011 is applied to the input signal x(n), the input signal x(n) has an opposite value of an amount of the ISI by the previous signal. When 1011 is applied to the input signal x(n), the ISI by the input signal before two periods has the same value as when the input signal is 1111. However, the ISI by the input signal before a period has an opposite value.

Therefore, when a region difference between DFE output signals when the pattern of the input signal x(n) is 1111 and X011 is used as the e[n], all of the ISI can be removed, so that the e[n] has a value of 0. When the input signal is 1011, the sign-sign LMS algorithm determines the a1, and when the input signal is 0011, the algorithm determines the a2.

Figure 8:
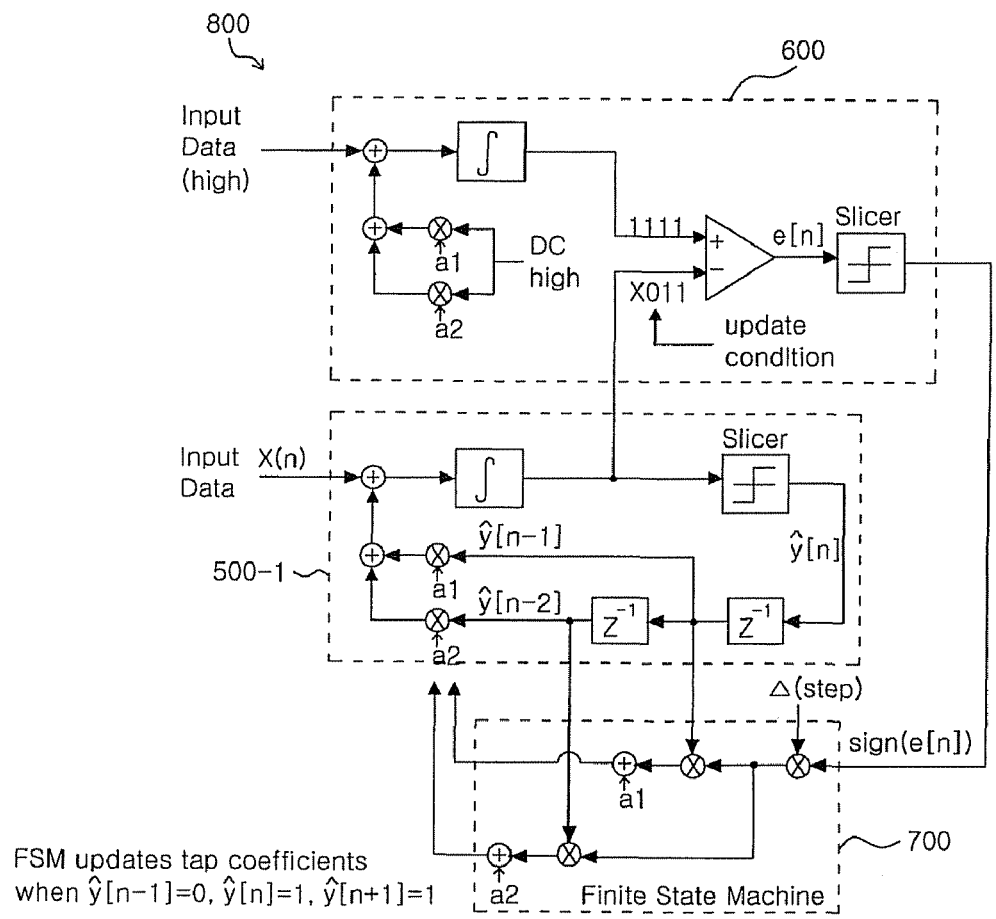
FIG. 8 is a circuit diagram for explaining an integrating receiver system having an adaptive DEF function according to a second embodiment of the present invention.
Figure 9:
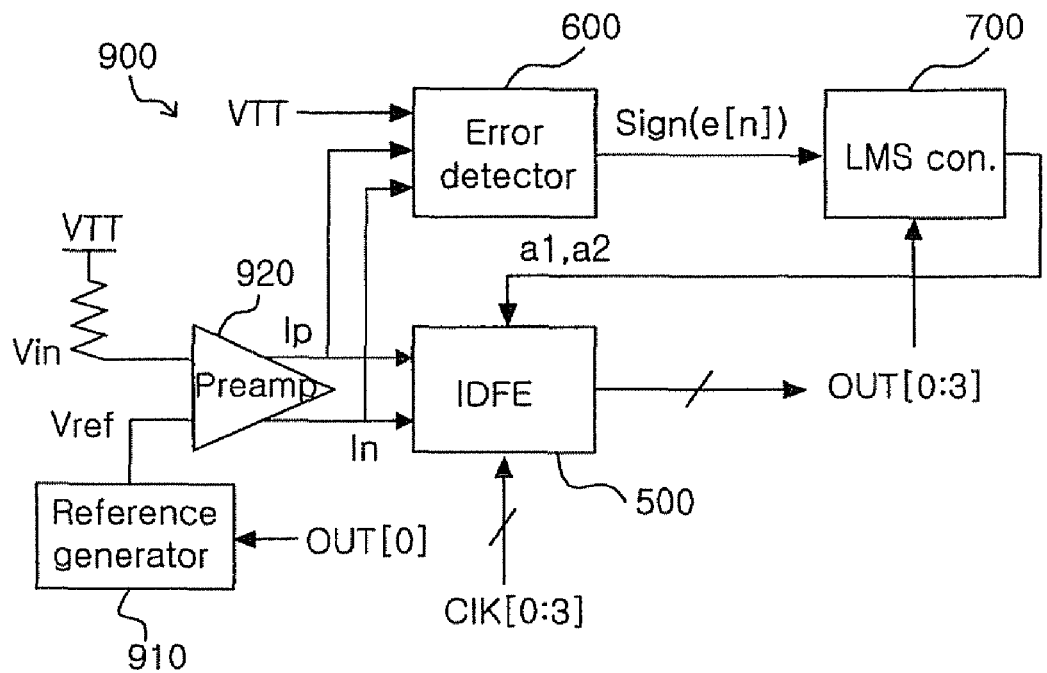
FIG. 9 is a view for explaining an entire circuit diagram of a receiver circuit according to a third embodiment of the present invention.

FIG. 8 is a circuit diagram for explaining an integrating receiver system having an adaptive DEF function according to a second embodiment of the present invention. Referring to FIG. 8, the integrating receiver system 800 includes an integrating receiver 500-1, an error detector 600, and an LMS controller 700. The integrating receiver 500-1 is described in advance with reference to FIG. 5. In order to obtain a DFE output value when the input signal pattern is 1111, the error detector 600, as described above with reference to FIG. 7, applies a maximum voltage magnitude of the signal as an input of a DFE circuit in a direct current (DC). When the input signal pattern is 1111, an output value of an equalizer always exists, however, when the input signal pattern is X011, the output value of the equalizer is applied sometimes according to the input signal. Therefore, the equalizer coefficient is changed only when the input signal pattern is X011. When the equalizer coefficient is converged by using the LMS controller 700, the equalizer coefficient is changed by few bits from the converged value. FIG. 9 is a view for explaining an entire circuit diagram of a receiver circuit according to a third embodiment of the present invention. Referring to FIG. 9, a receiver 900 includes a reference voltage generator 910, an amplifier 920, a decision feedback equalizer having an integration function (IDFE) 500, an error detector 600, and an LMS controller 700. The receiver 900 receives a clock having four uniform intervals to decide data in a demultiplexing method.

Figure 10:
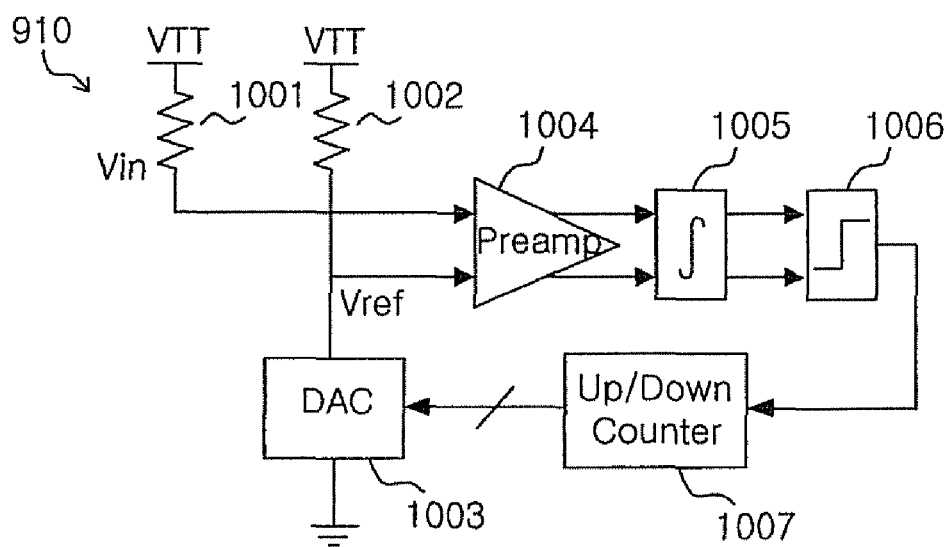
FIG. 10 is a circuit diagram showing a reference voltage generator in FIG. 9.

The reference voltage generator 910 receives a clock signal as an input in an initial system setting mode to generate a reference voltage having an intermediate voltage of the input signal. FIG. 10 is a circuit diagram showing the reference voltage generator 910 according to the present invention. The reference voltage generator 910 includes resistances 1001 and 1002, a digital-analog converter (DAC) 1003, an amplifier 1004, an integrator 1005, a comparator 1006, and an up/down counter 1007. When the reference voltage generator 910 generates a reference voltage Vref, the reference voltage generator 910 receives the clock signal instead of data as the input signal Vin.

Figure 11:
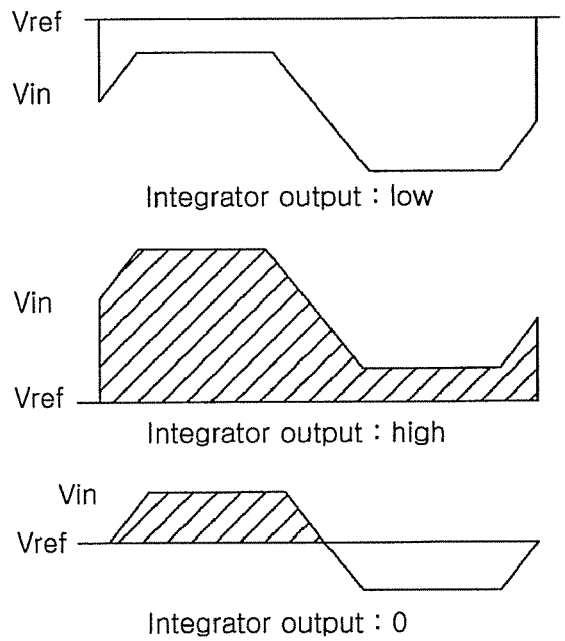
FIG. 11 is a view for explaining operations of the reference voltage generator in FIG. 10.

FIG. 11 is a view for explaining operations of the reference voltage generator 910. Referring to FIG. 11, when the clock as the input signal Vin is integrated, an output of the integrator 1005 has a value of positive, negative, or 0 according to a level of the reference voltage Vref. When the output of the integrator 1005 is transmitted to the comparator 1006 and to be decided as a ± value, and the up/down counter 1007 is controlled to allow the value obtained by integrating the clock signal to be 0, the reference voltage Vref is optimized. A digital output value of the up/down counter 1007 is changed to a current value through the DAC 1003 and applied to the resistance 1002 to generate the reference voltage Vref. Therefore, the reference voltage generator 910 has an advantage in that even though an output magnitude of a transmitter or a value of the reference voltage is changed in manufacturing processes, the reference voltage generator 910 can generate an optimized reference voltage. In addition, noises applied to a power source VTT are perceived as common mode noises in the input signal Vin and the reference voltage Vref such that the noises can be removed by the receiver 900 (see FIG. 9).

Figure 12:
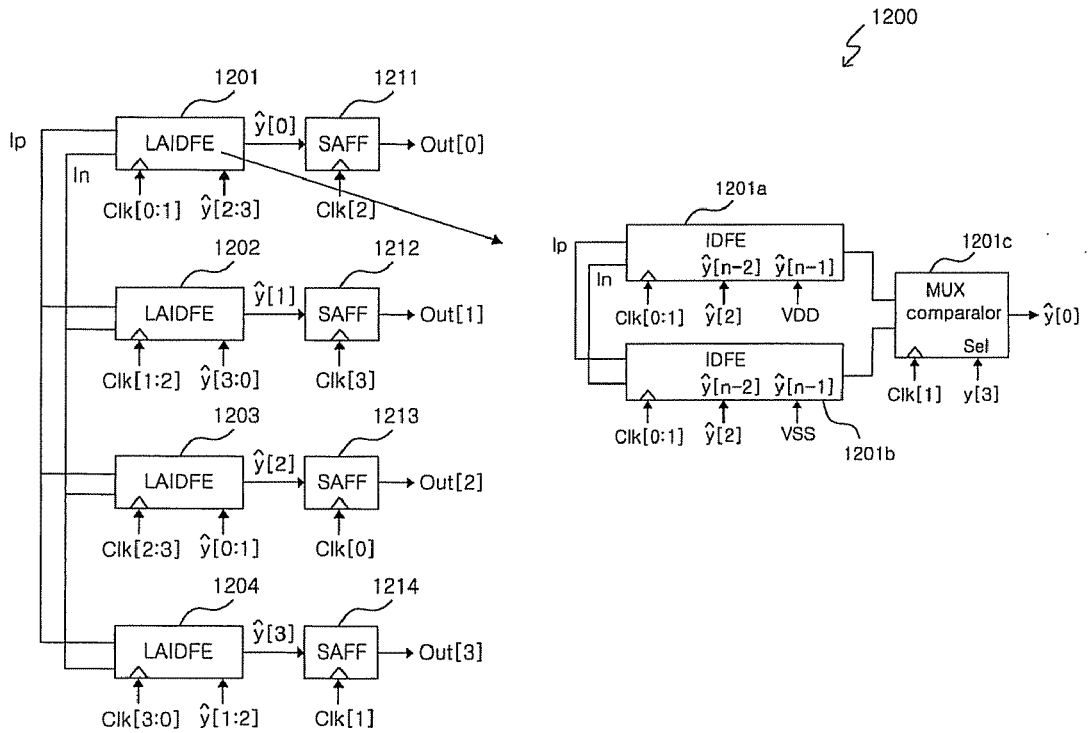
FIG. 12 is a view for explaining a decision feedback equalizing receiver having an integration function according to a fourth embodiment of the present invention.

FIG. 12 is a view for explaining a decision feedback equalizing receiver having an integration function according to a fourth embodiment of the present invention. Referring to FIG. 12, a receiver 1200 includes four decision feedback equalizers having a look-ahead integration function (LA IDFE) 1201 to 1204 and four flip flops 1211 to 1214. Each of the LA IDFEs 1201 to 1204 receives input signals during a ¼ time of a data frequency. Each of the LA IDFEs 1201 to 1204 receives values decided before a period and before two periods for the equalizers. Each of the LA IDFEs 1201 to 1204 includes two IDFE integrators 1201a and 1201b and a comparator 1201c having a multiplexing function. The IDFE integrator 1201a is used when the data value decided before a period is 0, and the IDFE integrator 1201b is used when the data value decided before a period is 1. The comparator 1201c having a multiplexing function selects one from outputs of the two DFE integrators 1201a and 1201b according to the data value decided before a period. In this method, a feedback time of the DFE decreases, so that a maximum operation frequency of the receiver increases.

Figure 13:
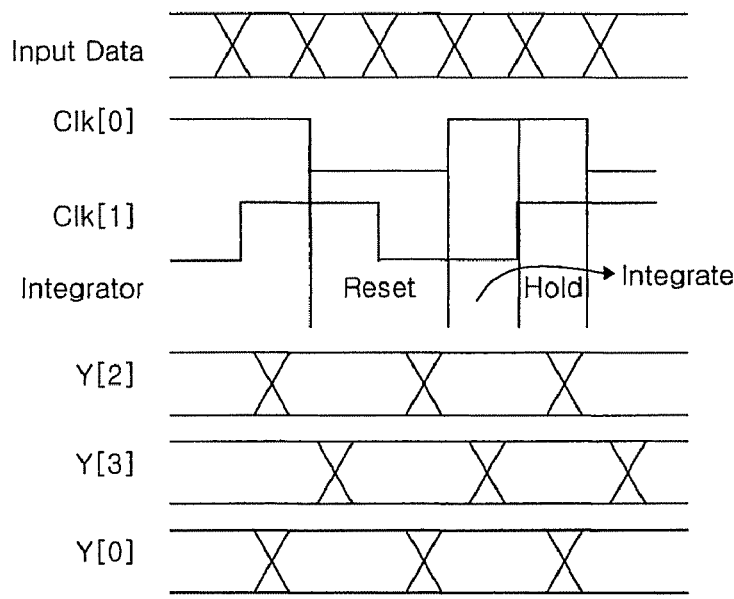
FIG. 13 is a view showing an operation timing diagram of a receiver in FIG. 12.

FIG. 13 is a view showing an operation timing diagram of the receiver 1200. Referring to FIG. 13, in order to perform a data integration, a data value decided before two periods and a data value decided before a period are needed. The value decided before two periods is ŷ[2], and the value decided before a period is y[3]. The integration is performed when Clk[0] is logic high and Clk[1] is logic low. Before the integration y[2] is always decided. However, a value of y[3] cannot be decided before the integration due to a feedback delay time. Therefore, a look-ahead method is needed. In the embodiment of the present invention, two DFE integrators having a fixed y[3] value is used.

Figure 14:
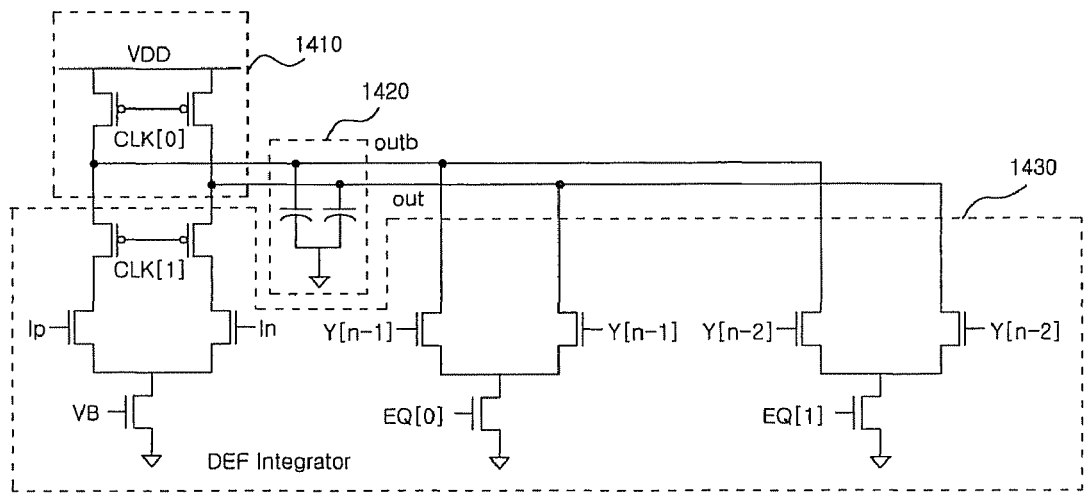
FIG. 14 is a circuit diagram for explaining a 2-tap DFE integrator according to a fifth embodiment of the present invention.

FIG. 14 is a circuit diagram for explaining a 2-tap DFE integrator according to a fifth embodiment of the present invention. Referring to FIG. 14, 2-tap DFE integrators 1201a and 1201b include a precharge unit 1410 for precharging outputs out and outb of the integrators 1201a and 1201b as a power source voltage VDD in response to the first clock signal Clk[0], capacitors 1420 connected to the outputs of the integrators 1201a and 1201b, and differential comparators 1430 which integrate input signals Ip and In during a ¼ time of a data frequency in response to the second clock signal Clk[1] according to the values decided before a period /Y[n−

1] and Y[n−1] and before two periods /Y[n−2] and Y[n−2] and store them in the capacitors 1420.

The output signals out and outb of the 2-tap DFE integrators 1201a and 1201b are charged as a power source voltage VDD when the clock signal Clk[0] is logic low. When the clock signal Clk[0] is logic high, and the Clk[1] is logic low, an integration is performed. Both the clocks signals Clk[0] and Clk[1] are logic high, the output signals out and outb nodes maintain their states. When the integration is terminated, a differential output voltage value of the integrator is obtained by the following Equation 6.

$$\Delta V_{out} = \frac{1}{C} g_m \cdot \int \left( Ip(t) - In(t) - a1 \frac{1}{g_m} y[n-1] - a2 \frac{1}{g_m} y[n-2] \right) dt \quad \text{[Equation 6]}$$

where first two parts in an integral symbol represent an integration of the input signals and last two parts represent a DFE function. EQ[0] and EQ[1] shown in FIG. 14 determine a1 and a2, respectively. Therefore, this circuit simultaneously performs an integration function and a DFE function.

Figure 15:
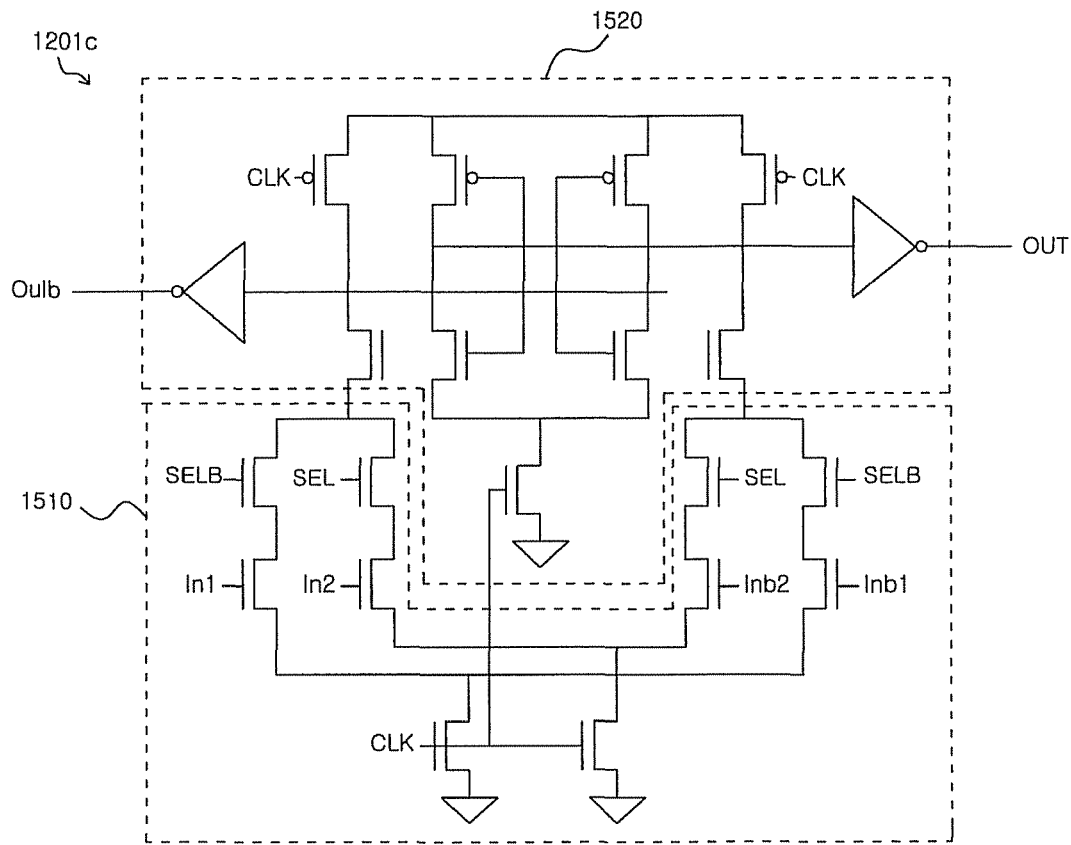
FIG. 15 is a circuit diagram for explaining a comparator having a multiplexing function according to a sixth embodiment of the present invention.

FIG. 15 is a circuit diagram for explaining a comparator having a multiplex function according to a sixth embodiment of the present invention. Referring to FIG. 15, the comparator 1201c includes a 2-to-1 multiplex 1510 with a differential type and a flip flop 1520 with a fine amplifier type. The comparator 1201c does not use a latch but uses an inverter for an output of the flip flop 1520 in a DFE circuit in the convention look-ahead method. As a result, a delay time of the comparator 1201c decreases, and the operation speed of the DFE increases.

Figure 16:
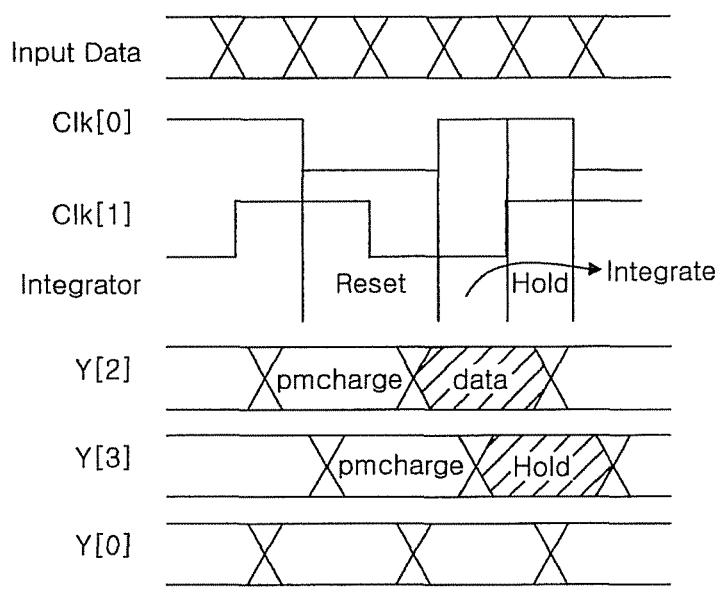
FIG. 16 is a timing diagram for explaining operations of the comparator in FIG. 15 in relation to the operation timing diagram of the receiver in FIG. 12.

FIG. 16 is a timing diagram for explaining operations of the comparator 1201c in relation to the operation timing diagram (see FIG. 13) of the receiver 1200 in FIG. 12. Referring to FIG. 16, in the receiver 1200, the output signals out and outb have a value of VSS during a precharge time of the comparator 1201c, however, the time during which the integrators 1201a and 1201b perform an integration function does not belongs to the precharge section. Therefore, the output signals out and outb do not need to maintain output values during the entire period of the clock.

Figure 17:
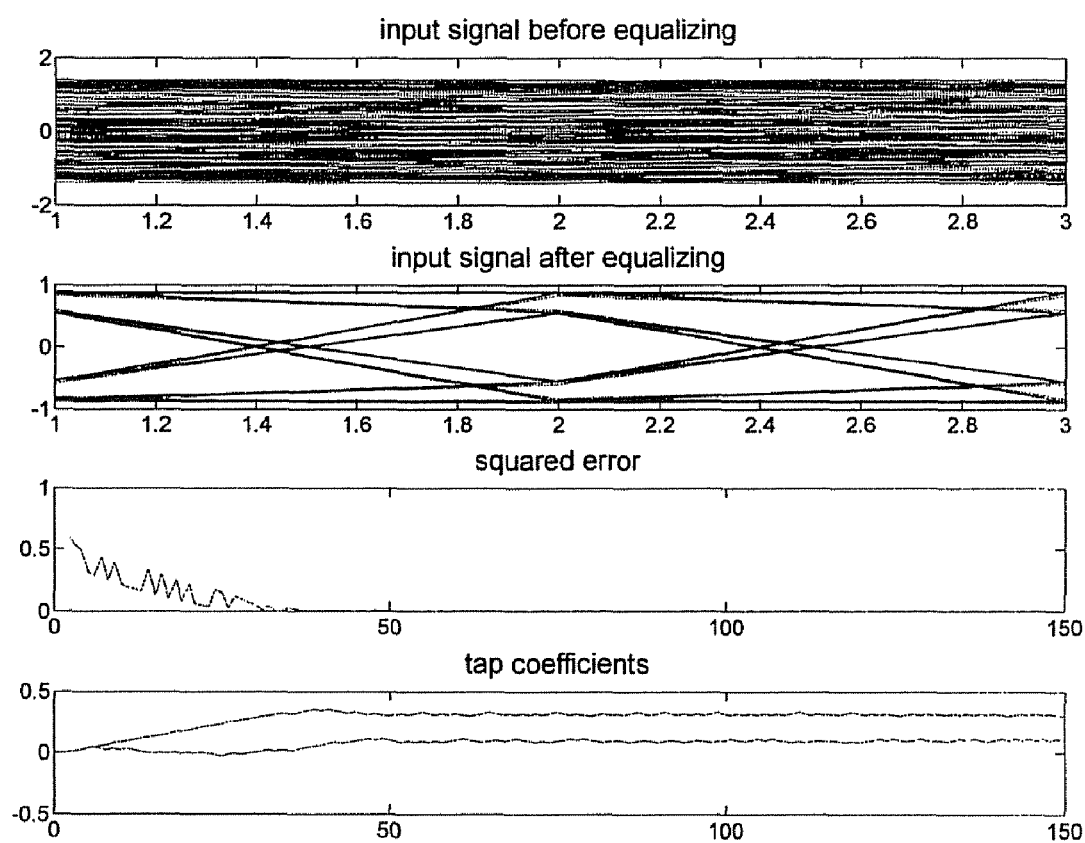
FIG. 17 is a view showing a result of a simulation in the receiver in FIG. 12.

FIG. 17 is a view showing a result of a simulation in the receiver 1200. (a) waveform is an eye pattern of the input signal before passing the equalizer, in which an ISI and high frequency noises exist. In this state, the eye is completely closed, so that data decision is impossible. (b) waveform is an eye pattern of an output of the equalizer when the IDEF is correctly operated to obtain the equalizer coefficients. In this state, the eye is open, so that data decision is possible. (c) and (d) waveforms show an error signal and an equalizer coefficient when the sign LMS error algorithm according to the embodiment of the present invention is operated. When the equalizer coefficient is converged to a proper value, the error becomes 0.

According to a receiver of the present invention, an inter-symbol interference (ISI) and high frequency noises that will be a problem of a high speed DRAM data transmission system can be simultaneously removed. The receiver simultaneously performs an equalizer function and an integration function by using a single circuit. In this method, a probability of wrong decision of data decreases, so that a signal-to-noise ratio (SNR) of the receiver increases. Accordingly, even in an environment with heavy noises, a maximum operation speed increases.

A method of controlling a proper equalizer coefficient insensitive to a channel or a change in chip processes is used to obtain an equalizer coefficient suitable for the receiver according to the present invention.

A sign LMS error algorithm according to the present invention can be simply implemented, and the sign LMS error algorithm decreases an area of a circuit and power consumption.

The receiver according to present invention provides a method of obtaining a reference voltage by using an integrator in a single ended transmission method.

The present invention can be applied to a general serial communication method, and a maximum data transmission speed can be increased as compared with a conventional receiver.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An integrating receiver in a data transmission system operating with a data period, the integrating receiver comprising:
  a DFE (decision feedback equalizer); and
  an integrator performing an integration on an output signal of the DFE during one data period to provide an integrator output signal based on the integrated output signal of the DFE,
  wherein an ISI (inter-symbol interference) of a waveform equalized by the DFE is removed by using data values delayed by one data period and by two data periods, and
  wherein the DFE comprises:
    an adder which receives an input signal input to the integrating receiver and first and second feedback data signals provided at an output of a feedback filter, wherein the adder generates the output signal of the DFE based on a sum of the input signal and the first and second feedback data signals;
    a decider comparing the integrator output signal with a predetermined reference voltage and producing a compared data signal; and
    the feedback filter receiving at an input the compared data signal, and producing the first and second feedback data signals by respectively delaying the compared data signal by one data period and by two data periods, and multiplying the delayed compared data signals by first and second equalizer coefficients, respectively.

2. The integrating receiver of claim 1,
  wherein the first equalizer coefficient is set equal to the average value of ISI values measured between 1.5 T and 2.5 T following the beginning of an input pulse received by the integrating receiver,
  wherein the second equalizer coefficient is set equal to the average value of the ISI values measured between 2.5 T and 3.5 T, and
  wherein T is the width of the input pulse received by the integrating receiver.

3. The integrating receiver of claim 1,
  wherein the integrating receiver computes an error signal based on the difference between the output signal of the DFE produced when a pattern of the input signal input to the integrating receiver is 1111 and the output signal of the DFE produced when the pattern is X011, and wherein when a value of the error signal is 0, the integrating receiver computes the first equalizer coefficient based on a sign least mean-squared (LMS) error algorithm when the pattern of the input signal is 1011, and computes the second equalizer coefficient based on a signal LMS error algorithm when the input signal is 0011.

4. An integrating receiver system in a data transmission system operating with a data period, the integrating receiver system comprising:

an integrating receiver producing an integrator output signal by integrating an input signal during one data period, and removing an ISI (inter-symbol interference) of the input signal using delayed signals based on the integrator output signal and delayed by one data period and by two data periods;

an error detector generating an error signal based on the difference between a DFE output signal from the integrating receiver and a reference signal; and a least mean-squared (LMS) controller obtaining first and second equalizer coefficients based on the error signal and the delayed signals of the integrating receiver.

5. The integrating receiver system of claim 4, wherein the integrating receiver comprises:

an adder which receives the input signal and first and second feedback signals provided at an output of a feedback filter, and generates the DFE output signal based on the sum of the input signal and the first and second feedback signals;

an integrator performing an integration on the DFE output signal during one data period and producing an integrator output signal;

a decider comparing the integrator output signal with a predetermined reference voltage to produce a compared data signal; and the feedback filter receiving at an input the compared data signal, and producing the first and second feedback signals by respectively delaying the compared data signal by one data period and by two data periods, and respectively multiplying the delayed compared data signals by the first and second equalizer coefficients.

6. The integrating receiver system of claim 5, wherein when the error signal has a value of 0, the LMS controller determines the first equalizer coefficient based on a sign-sign LMS algorithm when a pattern of the input signal input to the integrating receiver is 1011, and determines the second equalizer coefficient based on a sign-sign LMS algorithm when a pattern of the input signal is 0011.

7. The integrating receiver system of claim 5, wherein the integrating receiver system further comprises a reference voltage generator which receives a clock as an input signal in an initial system setting mode and generates a reference voltage having an intermediate voltage of the input signal.

8. The integrating receiver system of claim 7, wherein the reference voltage generator comprises:

an integrator integrating the clock that is the input signal;

a comparator comparing an output of the integrator with the reference voltage;

an up/down counter controlling a value obtained by integrating the clock to have a value of 0 according to the decided value of the comparator;

a digital-analog converter converting a digital output value of the up/down counter into a current value; and a resistance with which the current value of the digital-analog converter is applied generates the reference voltage.

9. A receiver in a data transmission system operating with a data period, the receiver comprising:

decision feedback equalizers (DFEs) having a look-ahead integration function; and flip-flops connected to the DFEs, respectively, wherein each of the DFEs having the integration function receives an input signal during a ¼ time of a data period and receives data values delayed by one data period and by two data periods, and wherein each of the DFEs comprises:

a first DFE integrator that is operated when the data value delayed by one data period is 0;

a second DFE integrator that is operated when the data value delayed by one data period is 1; and a comparator that selects one from outputs of the first and second DFE integrators according to the data value delayed by one data period, and wherein each of the first and second DFE integrators comprises:

a precharge unit for precharging outputs of the first and second DFE integrators as a power source voltage in response to a first clock signal;

a capacitor connected to the outputs of the first and second DFE integrators; and a differential comparator which integrates input signals during a ¼ time of the data period in response to a second clock signal according to the values delayed by one data period and by two data periods and stores them in the capacitor.

10. The receiver of claim 9, wherein the comparator comprises:

2-to-1 multiplex with a differential type for selecting one from the outputs of the first and second DFE integrators in response to the selected signal;

a flip flop for fine amplifying the output of the multiplex; and an inverter connected to the output of the flip flop.

* * * * *